(12) United States Patent
Henry et al.

(10) Patent No.: US 11,855,708 B2
(45) Date of Patent: Dec. 26, 2023

(54) QUALITY OF EXPERIENCE (QOE) EVALUATION SCHEME FOR MULTI-ACCESS, OPEN ROAMING (OR)-BASED NETWORKS

(71) Applicant: Cisco Technology, Inc., San Jose, CA (US)

(72) Inventors: Jerome Henry, Pittsboro, NC (US); Robert E. Barton, Richmond (CA); Nagendra Kumar Nainar, Morrisville, NC (US); Carlos M. Pignataro, Cary, NC (US); Bart A. Brinckman, Nevele (BE)

(73) Assignee: Cisco Technology, Inc., San Jose, CA (US)

( * ) Notice: Subject to any disclaimer, the term of this patent is extended or adjusted under 35 U.S.C. 154(b) by 15 days.

(21) Appl. No.: 18/066,193

(22) Filed: Dec. 14, 2022

(65) Prior Publication Data

US 2023/0114234 A1    Apr. 13, 2023

Related U.S. Application Data

(63) Continuation of application No. 17/301,203, filed on Mar. 29, 2021, now Pat. No. 11,558,130.

(51) Int. Cl.
*H04B 17/309* (2015.01)
*H04W 76/15* (2018.01)
(Continued)

(52) U.S. Cl.
CPC .......... *H04B 17/309* (2015.01); *H04W 24/08* (2013.01); *H04W 24/10* (2013.01); *H04W 76/15* (2018.02)

(58) Field of Classification Search
CPC ... H04W 72/543; H04W 28/26; H04W 24/10; H04W 24/08
(Continued)

(56) References Cited

U.S. PATENT DOCUMENTS 9,642,034 B2 *    5/2017    Zhu ..................... H04W 72/543
11,558,130 B2 *    1/2023    Henry .................. H04W 24/08
(Continued)

OTHER PUBLICATIONS

A. Ali, A. Kuwadekar and K. Al-Begain, "IP Multimedia Subsystem SIP Registration Signaling Evaluation for Mission Critical Communication Systems," 2015 IEEE International Conference on Data Science and Data Intensive Systems, Sydney, NSW, Australia, 2015, pp. 711-717, doi: 10.1109/DSDIS.2015.48. (Year: 2015).*

*Primary Examiner* — William D Cumming
(74) *Attorney, Agent, or Firm* — Patterson + Sheridan, LLP

(57) ABSTRACT

Techniques and apparatus for determining quality of experience (QoE) for wireless communications are described. One technique involves transmitting a QoE support message to an access point (AP) within an access network. The QoE support message queries whether the AP supports providing key performance indicators (KPI(s)) indicative of QoE provided by the access network. An indication of whether the AP supports providing the KPI(s) is received in response to the QoE support message. The KPI(s) are received when the AP supports providing the KPI(s). A determination is made whether to communicate with the AP based at least in part on the KPI(s). Communications are then performed in accordance with the determination.

20 Claims, 7 Drawing Sheets

(51) Int. Cl.
*H04W 24/10* (2009.01)
*H04W 24/08* (2009.01)
(58) Field of Classification Search
USPC .......................................................... 370/329
See application file for complete search history.

(56) References Cited

U.S. PATENT DOCUMENTS

| | | | |
|---|---|---|---|
| 2020/0112874 A1* | 4/2020 | Jheng | H04W 28/26 |
| 2022/0311523 A1* | 9/2022 | Henry | H04W 24/10 |
| 2023/0114234 A1* | 4/2023 | Henry | H04W 24/10 |
| | | | 370/329 |

* cited by examiner

QUALITY OF EXPERIENCE (QOE) EVALUATION SCHEME FOR MULTI-ACCESS, OPEN ROAMING (OR)-BASED NETWORKS

CROSS-REFERENCE TO RELATED APPLICATIONS

This application is a continuation of co-pending U.S. patent application Ser. No. 17/301,203 filed Mar. 29, 2021. The aforementioned related patent application is herein incorporated by reference in its entirety.

TECHNICAL FIELD

Embodiments presented in this disclosure generally relate to wireless networking, and more specifically, to techniques for evaluating quality of experience (QoE) for client devices when roaming.

BACKGROUND

Consumers increasingly expect their computing devices to remain connected to network-based services, regardless of their location. However, cellular services such as 4G LTE and 5G may provide less than optimal connections for certain locations that are indoors, far from cell towers, and/or otherwise obstructed. Technologies such as the Wireless Broadband Alliance (WBA) OpenRoaming™ use a federation-based framework to allow consumers to seamlessly roam onto Wi-Fi networks.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
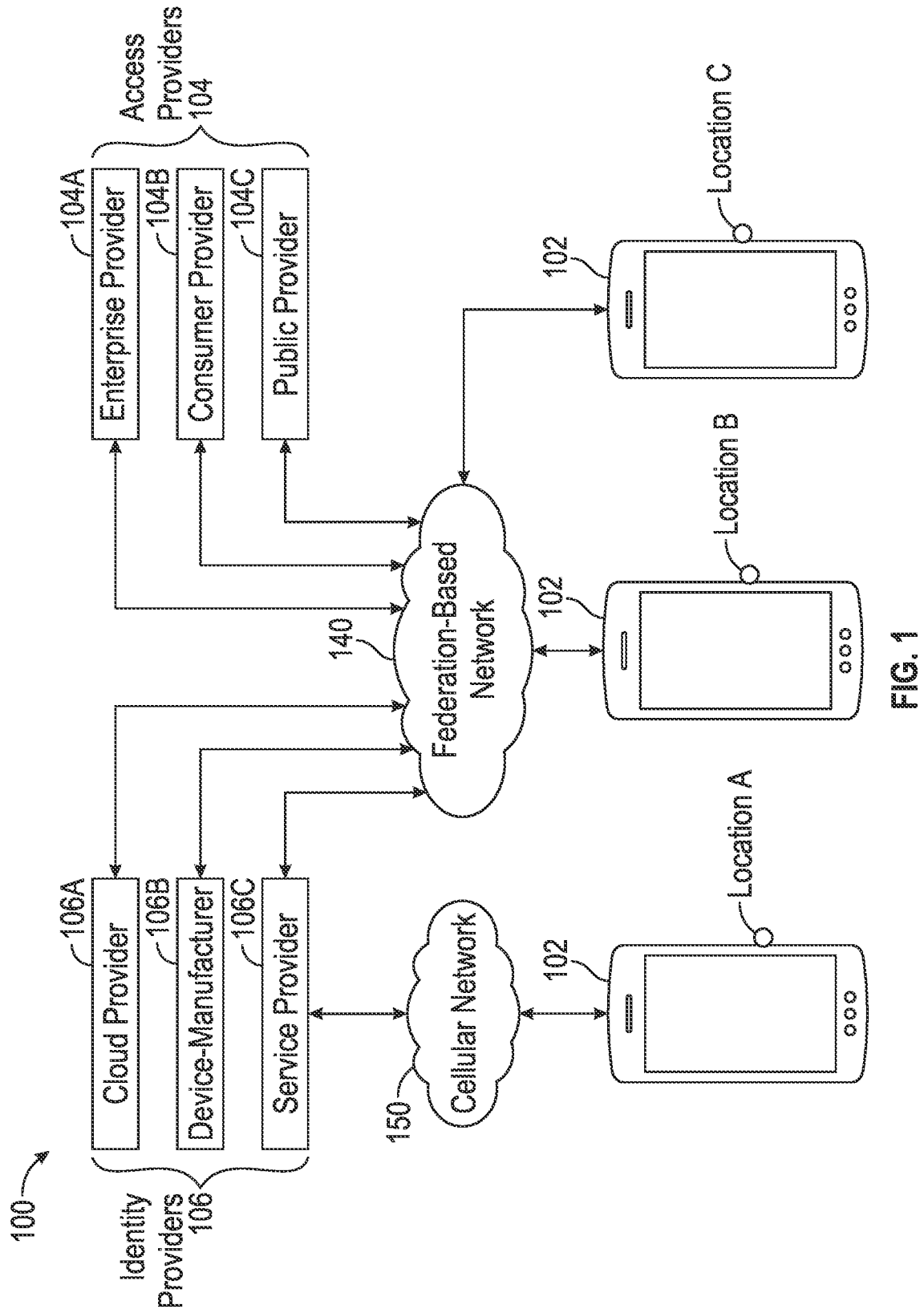
FIG. 1 is a diagram illustrating connection of a client device to a federation-based network while roaming, according to one embodiment.

One embodiment presented in this disclosure provides a computer-implemented method of determining quality of experience (QoE) for wireless communications by a client device. The computer-implemented method generally includes transmitting a first QoE support message to an access point (AP) within an access network, the first QoE support message querying whether the AP supports providing one or more first key performance indicators (KPIs) indicative of QoE provided by the access network. The computer-implemented method also includes receiving, in response to the first QoE support message, an indication of whether the AP supports providing the one or more first KPIs, and receiving the one or more first KPIs from the AP, when the AP supports providing the one or more first KPIs. The computer-implemented method further includes determining whether to communicate with the AP based at least in part on the one or more first KPIs, and performing communications in accordance with the determination.

Another embodiment presented in this disclosure provides an apparatus. The apparatus includes a processor and a memory containing a program that, when executed by the processor, performs an operation. The operation includes transmitting a first QoE support message to an access point (AP) within an access network, the first QoE support message querying whether the AP supports providing one or more first key performance indicators (KPIs) indicative of QoE provided by the access network. The operation also includes receiving, in response to the first QoE support message, an indication of whether the AP supports providing the one or more first KPIs, and receiving the one or more first KPIs from the AP, when the AP supports providing the one or more first KPIs. The operation further includes determining whether to communicate with the AP based at least in part on the one or more first KPIs, and performing communications in accordance with the determination.

Another embodiment presented in this disclosure provides a non-transitory computer readable storage medium having computer executable code stored thereon. The computer executable code is executable by one or more processors to perform an operation. The operation includes transmitting a QoE support message to an access point (AP) within an access network, the QoE support message querying whether the AP supports providing one or more key performance indicators (KPIs) indicative of QoE provided by the access network. The operation also includes receiving, in response to the QoE support message, an indication of whether the AP supports providing the one or more KPIs, and receiving the one or more KPIs from the AP, when the AP supports providing the one or more KPIs. The operation further includes determining whether to communicate with the AP based at least in part on the one or more KPIs, and performing communications in accordance with the determination.

Example Embodiments

Technologies such as OpenRoaming™ permit client devices to roam to different access network providers without requiring repeated logins or authentications. Identity providers may seek to offer additional services beyond roaming, such as providing network-based (e.g., cloud-based) security services to the client devices. The client devices may roam to different networks that support different radio access technologies (RATs). For example, a client device may initially be connected to a first network (e.g., cellular network) via a first RAT (e.g., 4G LTE or 5G NR) and may switch (or roam) to a second network via a second RAT (e.g., WiFi). For a Federation-based guest WiFi system (e.g., OpenRoaming), a client device may automatically connect to wireless local access networks (WLANs) that advertise the OpenRoaming (OR) roaming consortium organization identifier (RCOI), as soon as the client device is in range of the WLANs.

In multiple-access environments, a client device may choose whether to stay on a current network or join a new network. For example, in a Federation-based guest WiFi, a client device may choose to (i) join a WLAN or (ii) stay on LTE, depending on the performance of the LTE link. In some cases, for example, the client device may choose to stay on the LTE link if the WLAN provides poor performance due to, e.g., the client device being at the edge of the network, the client device being in a bad area with a lot of interference, etc.

When choosing to join the WLAN, the client device traffic may be sent entirely through the WLAN link (e.g., WiFi link) or the client device traffic may be load balanced (or split) between the LTE and WLAN links. The decisions regarding whether to join a WLAN can be made by (i) the client device independently, (ii) the access network provider for the WiFi link, (iii) the service provider for the cellular (LTE or 5G) link, (iv) the identity provider (IdP) managing the client device connections, etc.

Embodiments described herein provide techniques for evaluating QoE to enable devices (e.g., client devices, access network providers, identity providers, etc.) to make decisions on access load balancing. More specifically, embodiments enable devices to exchange capability and key performance indicators (KPIs) types for client device, access network provider, and identity provider QoE evaluation. As described below, embodiments can augment 802.11u access network query protocol (ANQP) to allow for QoE capability signaling. Note, however, that embodiments can use other protocols for QoE capability signaling.

FIG. 1 is a diagram 100 illustrating connections of a client device 102 to a federation-based network 140 while roaming, according to one embodiment. The diagram 100 represents an example sequence of usage of a client device 102 by a user. For example, the sequence may represent trip of a user from a location A (e.g., park, street, car, etc.) to a location B (e.g., home, business, etc.) to a location C (e.g., café, restaurant, coffee shop, etc.).

The client device 102 may be implemented in any form suitable for wireless networking. In some embodiments, the client device 102 is implemented as a mobile computing device, such as a laptop computer, a tablet, a smartphone, a smart wearable device, etc. In other embodiments, the client device 102 may be a computing device integrated into a vehicle. The client device 102 may also be referred to as a client station, client STA, STA, etc.

Here in FIG. 1, when the client device 102 is at location A, the client device 102 is wirelessly connected to a first network 150. The first network 150 is a cellular network, such as 4G LTE or 5G cellular network. Although not shown, the first network 150 may provide accessibility to an external network, such as a public network (e.g., the Internet). The first network 150 is managed by a service provider 106C, which provides one or more communication links for accessing the first network 150. For example, the service provider 106C can provide wireless connectivity for the client device 102 using, e.g., base stations (BSs) (also referred to as cellular base stations, node BSs (NBs), enhanced NBs (eNBs), gNBs, etc.), relays, other client devices 102, and so forth.

When the client device 102 is at location B, the client device 102 is wirelessly connected to a second network. In one example, the second network may be a home network (e.g., WiFi network) providing accessibility to an external network, such as a local area or local access network (LAN), a general wide area network (WAN), and/or a public network (e.g., the Internet). In another example, the second network may be an enterprise network (e.g., WiFi network) operated by an organization (or company or business). In one embodiment, the client device 102 may roam from the first network 150 to the second network (e.g., when the client device 102 is out of range of the first network 150 and is in range of the second network).

When the client device 102 is at location C, the client device 102 may be wirelessly connected to a third network, which may be a home WiFi network or an enterprise WiFi network. In one embodiment, the client device 102 may roam from the second network to the third network (e.g., when the client device 102 is out of range of the second network and is in range of the third network).

In some embodiments, when roaming to different WiFi networks (e.g., location B and/or location C), the client device 102 uses a federation-based network 140 to access the external network. The federation-based network 140 may be implemented using any standardized and/or proprietary techniques and protocols. For example, the federation-based network 140 may be compliant with OpenRoaming™.

The federation-based network 140 comprises access network providers 104 (also referred to as "access providers") providing wireless connectivity for the client device 102 using, e.g., access points (APs), wireless LAN controllers, and so forth. Some non-limiting examples of the access network providers 104 include enterprise access providers 104A (e.g., employers, manufacturing facilities), consumer access providers 104B (e.g., hotels, retailers), public access providers 104C (e.g., airports, universities, venues), and so forth.

The federation-based network 140 comprises identity providers 106 that operate to create, maintain, and/or manage identity information for users and that provide authentication services within the federation-based network 140. Some non-limiting examples of the identity providers 106 include cloud providers 106A (e.g., vendors providing scalable computing resources), device manufacturers 106B, and service providers 106C (e.g., telecommunications companies, utilities). By using the identity providers 106 to authenticate the user, the client device 102 may roam to the different access providers 104 without requiring repeated logins or authentications from the user.

Figure 2:
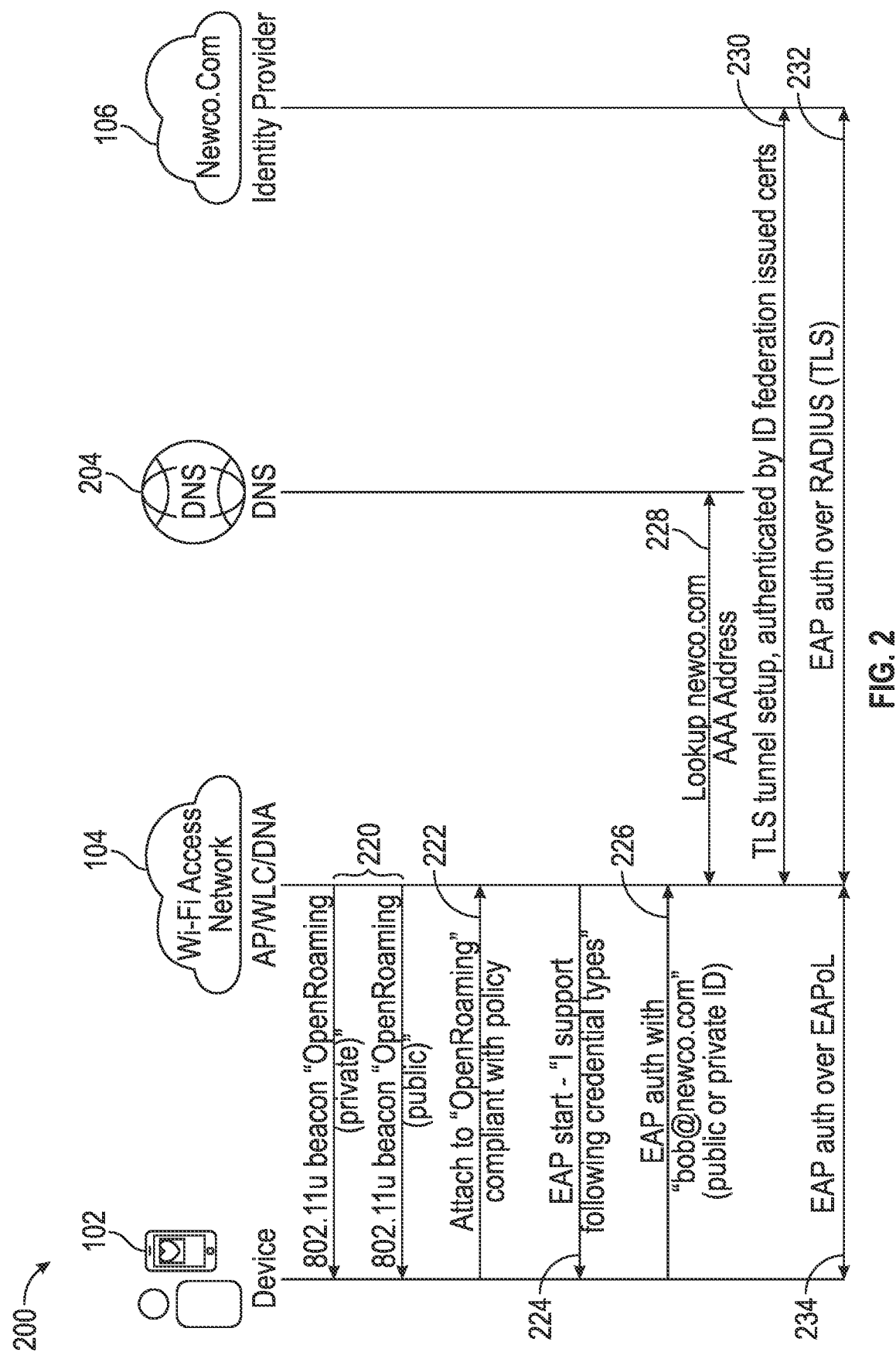
FIG. 2 is a diagram illustrating a sequence for connection of a client device to a federation-based network, according to one embodiment.

FIG. 2 is a flow diagram 200 illustrating a sequence for connection of a client device 102 to a federation-based network, according to one embodiment. The features illustrated in the diagram 200 may be used in conjunction with other embodiments, for example, illustrating connection of the client device 102 with an access provider 104 at any of the locations B or C illustrated in FIG. 1.

In the diagram 200, an access provider 104 transmits a beacon 220 announcing one or more parameters for connecting the client device 102 to the access provider 104. The beacon 220 may be implemented in any suitable form, such as an IEEE 802.11u beacon. In some embodiments, the beacon 220 indicates that the client device 102 must provide a private identification for the user. In other embodiments, the beacon 220 indicates that the client device 102 must provide only a public identification.

The client device 102 attaches to the access provider 205 responsive to the beacon 220 (222), and the access provider 104 begins authentication of the user, e.g., via the Extensible Authentication Protocol (EAP) process, by communicating one or more acceptable credential types to the client device 102 (224). The client device 102 may search a list of profiles stored thereon and may automatically select an identity corresponding to an acceptable credential type and that best matches the one or more parameters that had been specified by the access provider 104 (e.g., via the beacon 220).

The client device 102 provides the selected identity to the access provider 104 (226), and the access provider 104 contacts a Domain Name Service (DNS) server 204 using the identity (228). Using the results from the DNS server 210, the access provider 104 sets up an encrypted and authenticated Transport Layer Security (TLS) tunnel to an identity provider 106 (230). The identity provider 106 provides an EAP authorization using Remote Authentication Dial In User Service (RADIUS) attributes to the access provider 104 (232), and the access provider 104 provides an EAP authorization to the client device 102 using EAP over LANs (EAPoL) (234).

In multi-access environments that support OpenRoaming, it may be desirable to allow devices (e.g., client device, access network provider, service provider, identity provider, etc.) to determine the type of OR access for a client device when the client device is roaming. In some cases, for example, the client device may determine to remain on a cellular network rather than join a WiFi network, if the QoE provided by the WiFi network satisfies a predetermined condition (e.g., QoE is below a predetermined threshold). In another example, the client device may determine to roam to the WiFi network, e.g., if the QoE provided by the WiFi network satisfies a predetermined condition (e.g., QoE is greater than or equal to a predetermined threshold). In yet another example, the client device may determine to load balance traffic between the cellular network and the WiFi network, based on the QoE provided by the cellular network and/or the QoE provided by the WiFi network. In this example, for instance, the client device may send certain types of traffic via the WiFi network and send other types of traffic via the cellular network, based on the respective QoE of the WiFi network and the cellular network.

Embodiments described herein provide techniques for exchanging QoE capability signaling to allow devices (e.g., client devices, access network provider, identity provider, etc.). In one embodiment, devices can exchange capability and one or more KPIs (also referred to QoE metrics) to allow for QoE evaluation and decisions on access load balancing.

Figure 3:
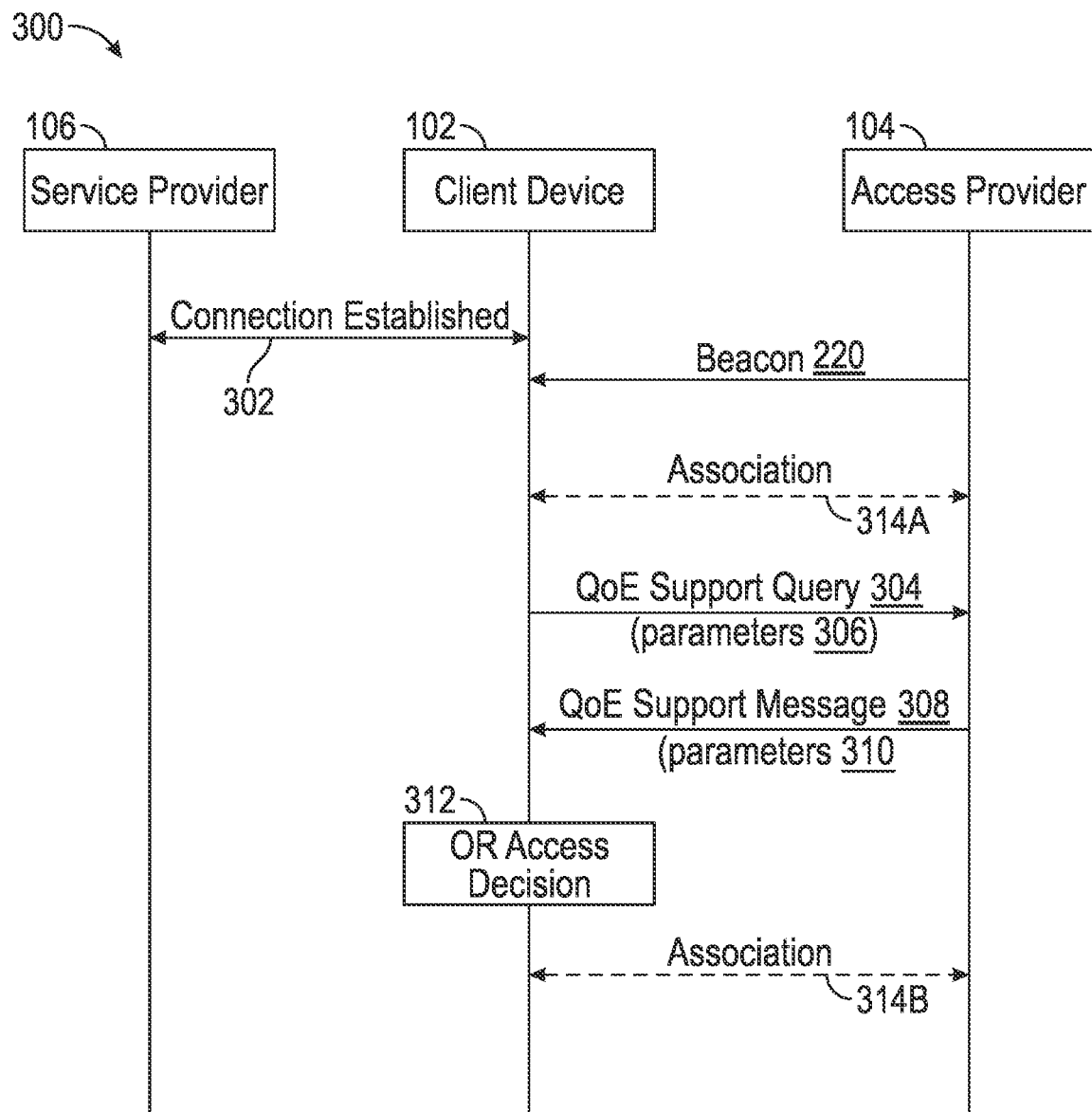
FIG. 3 is a diagram illustrating a sequence for exchanging QoE capability signaling, according to one embodiment.

FIG. 3 is a flow diagram 300 illustrating a sequence for exchanging QoE capability signaling, according to one embodiment. The features illustrated in the diagram 300 may be used in conjunction with other embodiments, for example, illustrating connection of the client device 102 with an access provider 104 at any of the locations B or C illustrated in FIG. 1.

In the diagram 300, the client device 102 has established a wireless connection 302 with a cellular network (e.g., LTE or 5G cellular network) via the service provider 106 (e.g., service provider 106C illustrated in FIG. 1). Subsequently, the client device 102 detects a beacon 220 from the access provider 104 due to, e.g., coming into range of the access provider 104. In response to detection of the beacon 220, the client device 102 sends a QoE support query 304 to the access network provider 104. The QoE support query 304 can query (or request or ask) whether the access provider 104 supports providing one or more performance metrics (e.g., KPIs) indicative of QoE provided by the access provider 104. In some embodiments, the QoE support query 304 includes one or more parameters 306. The parameter(s) 306 may allow the client device 102 to request performance metric(s) for one or more service level agreement (SLA) types. For example, the client device 102 can indicate a SLA type(s), including, but not limited to, per user bandwidth (BW), upstream BW, end-to-end, local jitter, delay, load, etc.

In one embodiment, the parameter(s) 306 can also indicate a QoE requestor value (e.g., STA requesting) along with a collection intent target value indicating a desired use of the performance metrics by the QoE requestor value. Examples of the collection intent target value can include, but are not limited to, statistical analysis, dynamic quality of service (QoS) policy setting, conditional access determination, application load balancing, etc.

The access provider 104 sends a QoE support message 308 in response to the QoE support query 304. The QoE support message 308 includes parameters 310. The parameters 310 can include a QoE support flag ("yes"/"no") indicating whether the access provider 104 supports providing performance metrics indicative of QoE. When the QoE support flag is set to "yes," the parameters 310 can also include the performance metrics. Additionally, when the QoE support query 304 requests performance metrics for one or more SLA types, the parameters 310 can indicate the type of SLA provided (e.g., per user BW, upstream BW, end-to-end or local jitter, delay, load, etc.) along with the performance metrics associated with that type of SLA. In some embodiments, the parameter(s) 310 can advertise a reporting type (e.g., in-band reporting type or out-of-band reporting type).

The client device 102 determines a type of OR access, based on the performance metrics provided by the access provider 104 (step 312). In embodiments where the QoE support message 308 indicates that the access provider 104 does not support providing performance metrics indicative of QoE (e.g., QoE support flag indicates "no"), then the client device 102 may automatically join (or associate) with the access provider 104.

In one embodiment at 312, the client device 102 can determine whether to join the access provider 104 (e.g., roam from the service provider 106 to the access provider 104), based on the performance metrics. In this embodiment, the QoE support query 304 is sent pre-association (e.g., prior to association (314B) with the access provider 104).

The client device 102 may determine to join the access provider 104 when one or more of the performance metrics satisfies a predetermined condition (e.g., one or more of the KPI(s) is greater than or equal to predefined threshold(s) for the respective KPI(s)). If the performance metrics satisfy the predetermined condition, then the client device 102 can complete association (314B) with the access provider 104 and communicate via a WiFi link provided by the access provider 104. On the other hand, if the client device 102 determines that the performance metric(s) do not satisfy the predetermined condition, then the client device 102 can determine to remain on the connection 302 with the cellular network via the service provider 106.

In another embodiment at 312, the client device 102 can determine a type of traffic to send via the access provider 104 and the service provider 106 and/or whether to load balance between the service provider 106 and the access provider 104, based on the performance metrics. In this embodiment, the QoE support query 304 can be sent pre-association (314B) or post-association (e.g., after association (314A) with the access provider 104). Here, at 312, the client device 102 an use the information returned from the access provider 104 to determine whether to load balance traffic, send certain traffic flows over WiFi (via the access provider 104) as opposed to over a cellular link (via the service provider 106), send certain traffic flows over the cellular link as opposed to over WiFi, and so forth. In one example, the client device 102 can send heavy (or higher priority) traffic (e.g., voice) over the communication link (e.g., WiFi link) with the higher QoE and lighter (or lower priority) traffic (e.g., video) over the communication link (e.g., cellular link) with the lower QoE.

Figure 4:
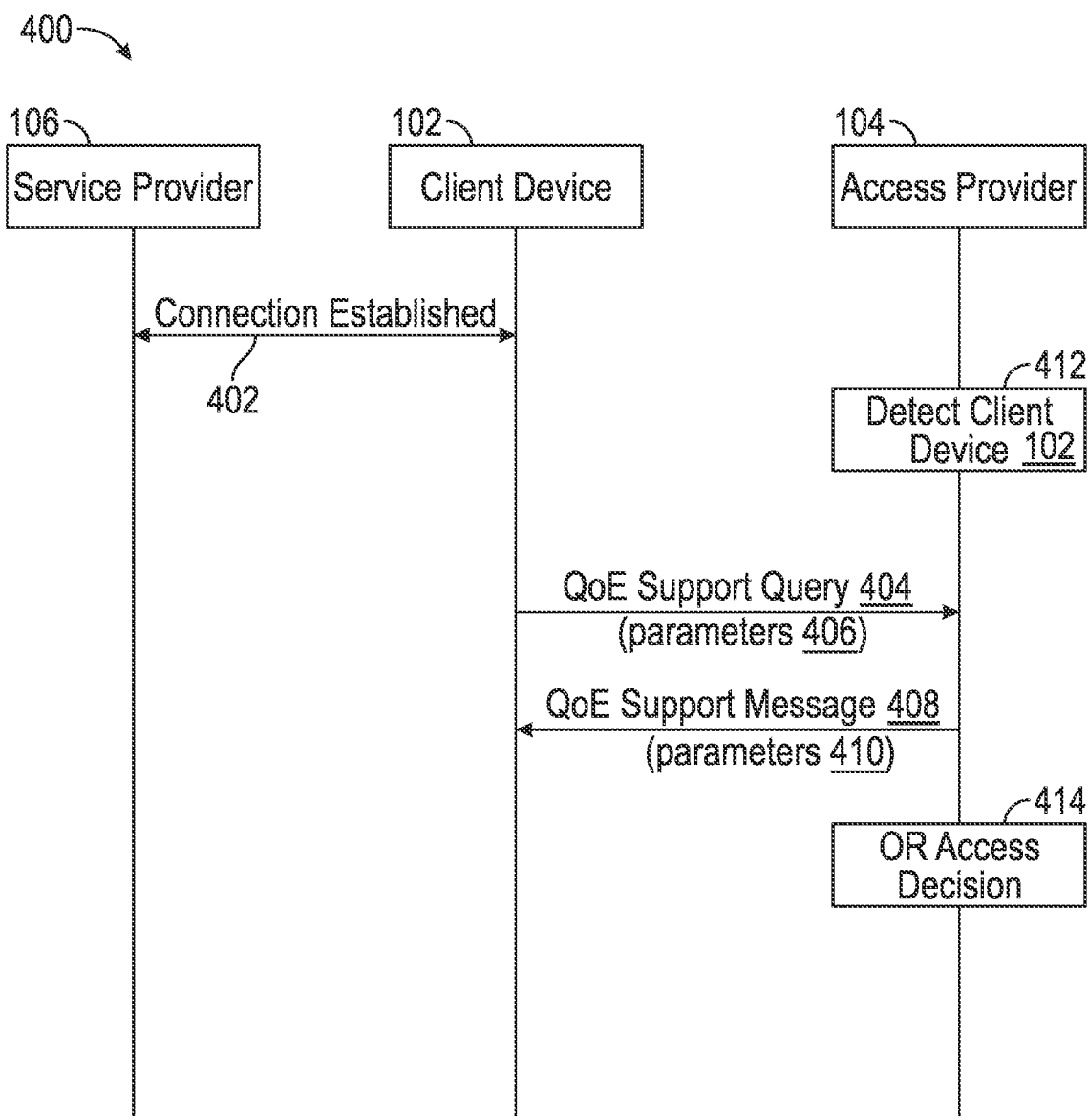
FIG. 4 is a flow diagram illustrating a sequence for exchanging QoE capability signaling, according to one embodiment.

FIG. 4 is a flow diagram 400 illustrating a sequence for exchanging QoE capability signaling, according to one embodiment. The features illustrated in the diagram 400 may be used in conjunction with other embodiments, for example, illustrating connection of the client device 102 with an access provider 104 at any of the locations B or C illustrated in FIG. 1, illustrating the sequence for exchanging QoE capability signaling in FIG. 3, etc.

In the diagram 400, the client device 102 has established a wireless connection 402 with a cellular network (e.g., LTE or 5G cellular network) via the service provider 106 (e.g., service provider 106C illustrated in FIG. 1). At 412, the access provider 104 detects the client device 102. In one embodiment, the access provider 104 can detect the client device 102 pre-association. In another embodiment, the access provider 104 can detect the client device 102 post-association. The access provider 104 sends a QoE support query 404 to the client device 102. The QoE support query 404 can query whether the client device 102 supports providing one or more performance metrics (e.g., KPIs) indicative of QoE at the client device 102. In some embodiments, the QoE support query 404 includes one or more parameters 406. The parameter(s) 406 may allow the client device 102 to request performance metric(s) for one or more SLA types (e.g., received signal strength indicator (RSSI), signal to noise ratio (SNR), per application buffer queue, etc.).

In one embodiment, the parameter(s) 406 can also indicate a QoE requestor value (e.g., access network requesting, identity provider (that the client device envisions to use) requesting, etc.) along with a collection intent target value indicating a desired use of the performance metrics by the QoE requestor value. Examples of the collection intent target value can include, but are not limited to, statistical analysis, dynamic QoS policy setting, conditional access determination, application load balancing, etc.

The client device 102 sends a QoE support message 408 in response to the QoE support query 404. The QoE support message 408 includes parameters 410. The parameters 410 can include a QoE support flag ("yes"/"no") indicating whether the client device 102 supports providing performance metrics indicative of QoE. When the QoE support flag is set to "yes," the parameters 410 can also include the performance metrics. Additionally, when the QoE support query 404 requests performance metrics for one or more SLA types, the parameters 410 can indicate the type of SLA provided (e.g., RSSI, SNR, per application buffer queue, etc.) along with the performance metrics associated with that type of SLA.

The access provider 104 determines a type of OR access for the client device 102, based on the QoE support message 408 (step 414). In embodiments where the QoE support message 408 indicates that the client device 102 does not support providing performance metrics indicative of QoE (e.g., QoE support flag indicates "no"), then the access provider 104 may allow the client device 102 to automatically join (or associate with) the access provider 104.

In some embodiments, at 414, the access provider 104 can determine whether to allow the client device 102 to join the access provider 104 (e.g., roam from the service provider 106 to the access provider 104), based on the performance metrics. In this embodiment, the QoE support query 404 can be sent pre-association (e.g., prior to association with the client device 102). The access provider 104 may determine to allow the client device 102 to join the access provider 104 when one or more of the performance metrics satisfies a predetermined condition (e.g., one or more of the KPI(s) is greater than or equal to predefined threshold(s) for the respective KPI(s)). If the performance metrics satisfy the predetermined condition, then the access provider 104 can complete association with the client device 102 and communicate via a WiFi link provided by the access provider 104. On the other hand, if the access provider 104 determines that the performance metric(s) do not satisfy the predetermined condition, then the access provider 104 may reject association with the client device 102, so that the client device 102 can remain on the connection 402 with the cellular network via the service provider 106.

In another embodiment at 414, the access provider 104 can determine a type of traffic for the client device 102 to send via the access provider 104 and the service provider 106 and/or whether to load balance the traffic between the service provider 106 and the access provider 104, based on the performance metrics. In this embodiment, the QoE support query 404 can be sent pre-association or post-association. At 414, the access provider 104 can use the information returned from the access provider 104 to determine whether to load balance traffic, allow certain traffic flows to be sent over WiFi (via the access provider 104) as opposed to over a cellular link (via the service provider 106), allow certain traffic flows to be sent over the cellular link as opposed to over WiFi, and so forth.

In some embodiments, when in-band only is supported, the client device 102 can collect QoE performance metrics from the access provider 104 in pre-association, and then send it to the QoE requestor (e.g., access provider 104, identity provider 106, etc.) via the cellular link (e.g., connection 402). Once association is completed, the client device 102 can use the WiFi link to report the QoE performance metrics. Additionally, the access provider 104 can also collect application requirements (or targets) (e.g., jitter target, delay target for specific applications or application types, etc.). The QoE performance metrics and/or the application requirements can be used by the client device 102 or the access provider 104 to accept or reject the association to the OR WiFi network.

In some embodiments, when out-of-band is supported, the client device 102 can request the access provider 104 to relay the QoE performance metrics to the QoE requestor. In one particular embodiment, the client device 102 can use one or more ANQP queries to provide tuples {STA ID (e.g., MAC), requestor ID, location (e.g., FQDN or IP), KPI(s)} to the QoE requestor. In this embodiment, the access provider 104 can choose to accept the relayed metrics or decline the relayed metrics. In cases where the access provider 104 declines to relay the QoE performance metrics, the in-band technique can be used to provide QoE performance metrics to the QoE requestor. In some cases, the access provider 104 can choose to accept a partial relay. For example, the access provider 104 can choose to relay specific KPIs, choose to relay to specific requestors, choose to relay up to n KPIs, etc.

In some embodiments, the access provider 104 can provide a temporal connection to the client device 102 to allow the client device 102 to send QoE performance metrics. For example, the temporal connection may allow the client device 102 to obtain an IP address, to obtain secured connectivity to a QoE requestor, to forward the KPI(s), etc. In some cases, the access provider 104 may choose to accept the request for a temporal QoE-report connection for particular QoE requestors.

In some cases, the QoE requestor node may or may not support in-situ OAM (IOAM, depending on the type of QoE to report and the QoE requestor (e.g., client device, access provider, identity provider, etc.). Embodiments here provide techniques for handling scenarios in which the QoE requestor node does support in-situ OAM and scenarios in which the QoE requestor node does not support in-situ OAM. To handle both scenarios, embodiments can use different gateway (GW) addresses. The default GW address can be encoded with an in-built instruction that signals if the default GW of the access network should remove or leave the IOAM header.

Figure 5:
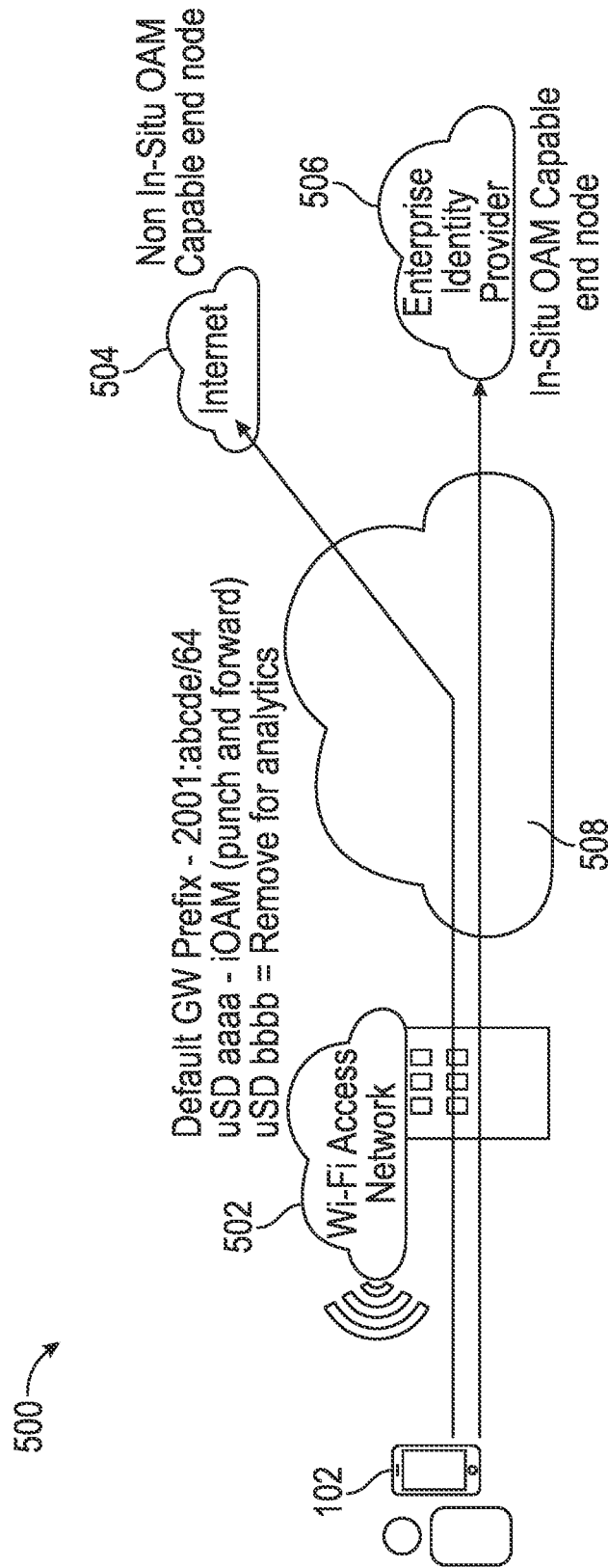
FIG. 5 illustrates an example of GW address instruction encoding when sending QoE performance metrics, according to one embodiment.

FIG. 5 illustrates an example of GW address instruction encoding when sending QoE performance metrics, according to one embodiment. Note that while FIG. 5 uses segment routing over IPv6 dataplane (SRv6) to describe instruction encoding, embodiments can use other mechanisms as well. As shown in FIG. 5, the network 504 (e.g., Internet) includes a non in-situ OAM capable end node and the network 506 (e.g., enterprise identity provider) includes an in-situ OAM capable end node.

The default GW 508 of the access network 502 can be programmed with two instructions: (1) INSTRUCT1—Append local OAM info and forward and (2) INSTRUCT 2—Remove the IOAM header and forward. Here, in FIG. 5 for example, "usID aaaa" is used as INSTRUCT1 and "usID bbbb" is used as INSTRUCT2. For both instructions, the default GW 508 can use the details for QoE analytics. Alternatively, the client device 102 can perform the QoE analytics.

In some embodiments, the client device 102 may be communicating with a remote node in an enterprise network (e.g., network 506) and the remote node may support IOAM. In these embodiments, the default GW 508 of the access network 502 does not have to remove the IOAM header. For example, the client device 102 can set (or program or encode) the default GW 508 with INSTRUCT1. As shown in FIG. 5, the SRv6 header can carry 2001:aaaa:<remaining-SID> in the traffic destined to the enterprise site (e.g., network 506). Under INSTRUCT1, the default GW 508 can punch its own OAM data (e.g., timers, etc.). The IOAM data can be used by an analytics server in the enterprise internal network and fed back to the client device 102.

In some embodiments, the client device 102 may be communicating with a remote node (e.g., Internet server) in an external network (e.g., network 504) and the remote node may not support IOAM. In these embodiments, the default GW 508 of the access network 502 may have to remove the IOAM header before forwarding the traffic out. For example, the client device 102 can set the default GW 508 with INSTRUCT2. As shown in FIG. 5, the SRv6 header can carry 2001:bbbb<remaining-SID> in the traffic destined for the Internet. Under INSTRUCT2, the default GW 508 can punch the OAM data and remove the header. This can be used either by the client device 102 or the default GW 508 for QoE analytics and fed back to the client device 102.

Figure 6:
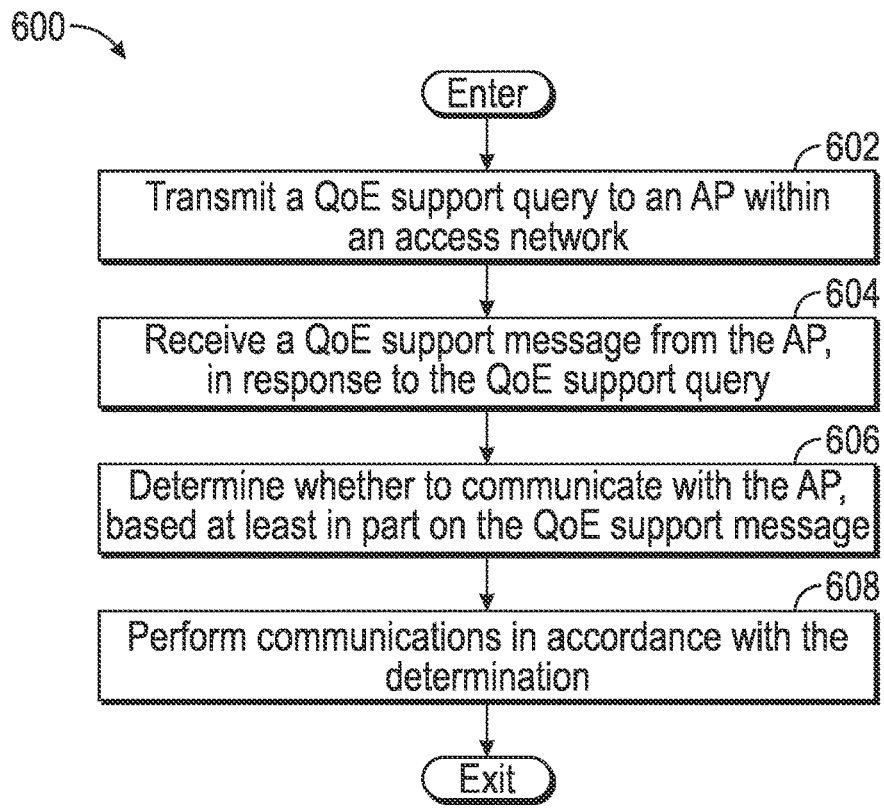
FIG. 6 is a flowchart of a method for wireless communications, according to one embodiment.

FIG. 6 is a flowchart of a method 600 for wireless communications, according to one embodiment. The method 600 may be performed by a client device (or STA) (e.g., client device 102).

Method 600 enters at block 602, where the client device transmits a QoE support query (e.g., QoE support query 304) to an AP within an access network (e.g., access provider 104). As noted, in one embodiment, the QoE support query can be sent prior to an association with the AP. In another embodiment, the QoE support query can be sent after an association with the AP. At block 604, the client device receives a QoE support message (e.g., QoE support message 308) from the AP, in response to the QoE support query. The QoE support message can include one or more parameters (e.g., parameters 310) indicating whether the AP supports providing KPI(s) indicative of QoE at the AP (e.g., from the perspective of the AP) (e.g., a QoE support flag) and/or the one or more KPIs.

At block 606, the client device determines whether to communicate with the AP, based at least in part on the QoE support message. At block 608, the client device performs communications in accordance with the determination. In one embodiment, the client device determines to automatically communicate with the AP, when the AP does not support providing the KPI(s). In another embodiment, the client device determines to refrain from communicating (or associating) with the AP, when the KPI(s) do not satisfy a predetermined condition. In this embodiment, the client device may continue to communicate via another connection (e.g., cellular connection). In yet another embodiment, the client device may determine to join the AP and/or send certain types of traffic to the AP, based on the KPIs. The method 600 then exits.

Figure 7:
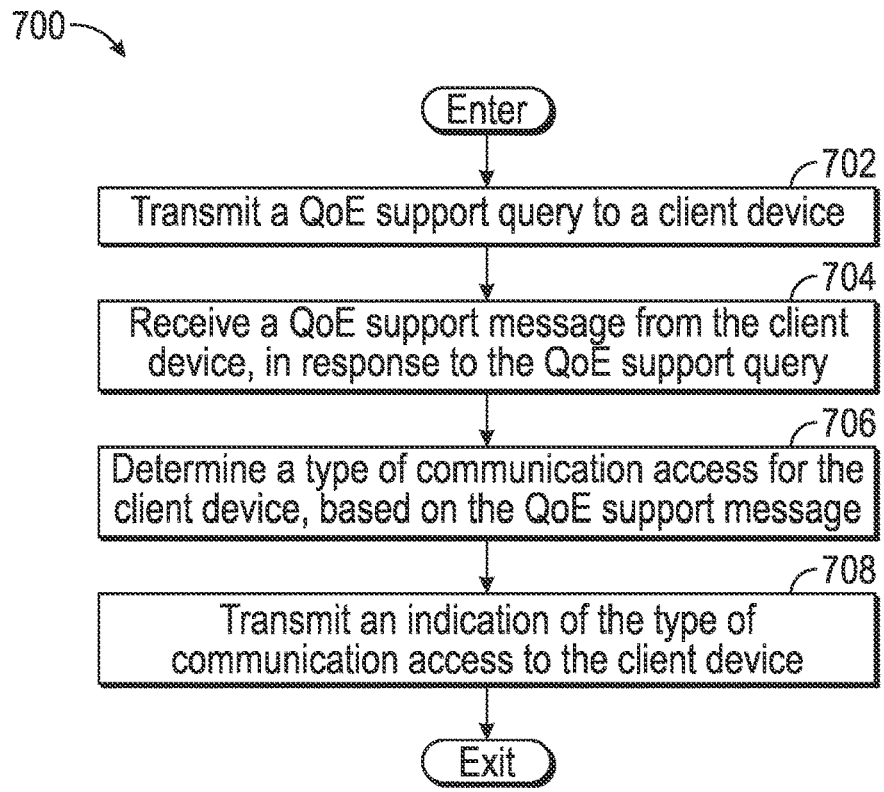
FIG. 7 is a flowchart of a method for wireless communications, according to one embodiment.

FIG. 7 is a flowchart of a method 700 for wireless communications, according to one embodiment. The method 700 may be performed by a network entity (e.g., AP).

Method 700 enters at block 702, where the network entity transmits a QoE support query (e.g., QoE support query 404) to a client device (e.g., client device 102). In one embodiment, the QoE support query can be sent prior to an association with the client device. In another embodiment, the QoE support query can be sent after an association with the client device. At block 704, the client device receives a QoE support message (e.g., QoE support message 408) from the client device, in response to the QoE support query. The QoE support message can include one or more parameters (e.g., parameters 410) indicating whether the client device supports providing KPI(s) indicative of QoE at the client device (e.g., from the perspective of the client device) (e.g., a QoE support flag) and/or the one or more KPIs.

At block 706, the network entity determines a type of communication access for the client device, based on the QoE support message. For example, the network entity may determine to refuse or reject the association with the client device, allow the client device to associate with the network entity, allow the client device to send certain types of traffic via the network entity, etc., based on the KPI(s) in the QoE support message. At block 708, the network entity transmits an indication of the type of communication access to the client device. The method 700 then exits.

Figure 8:
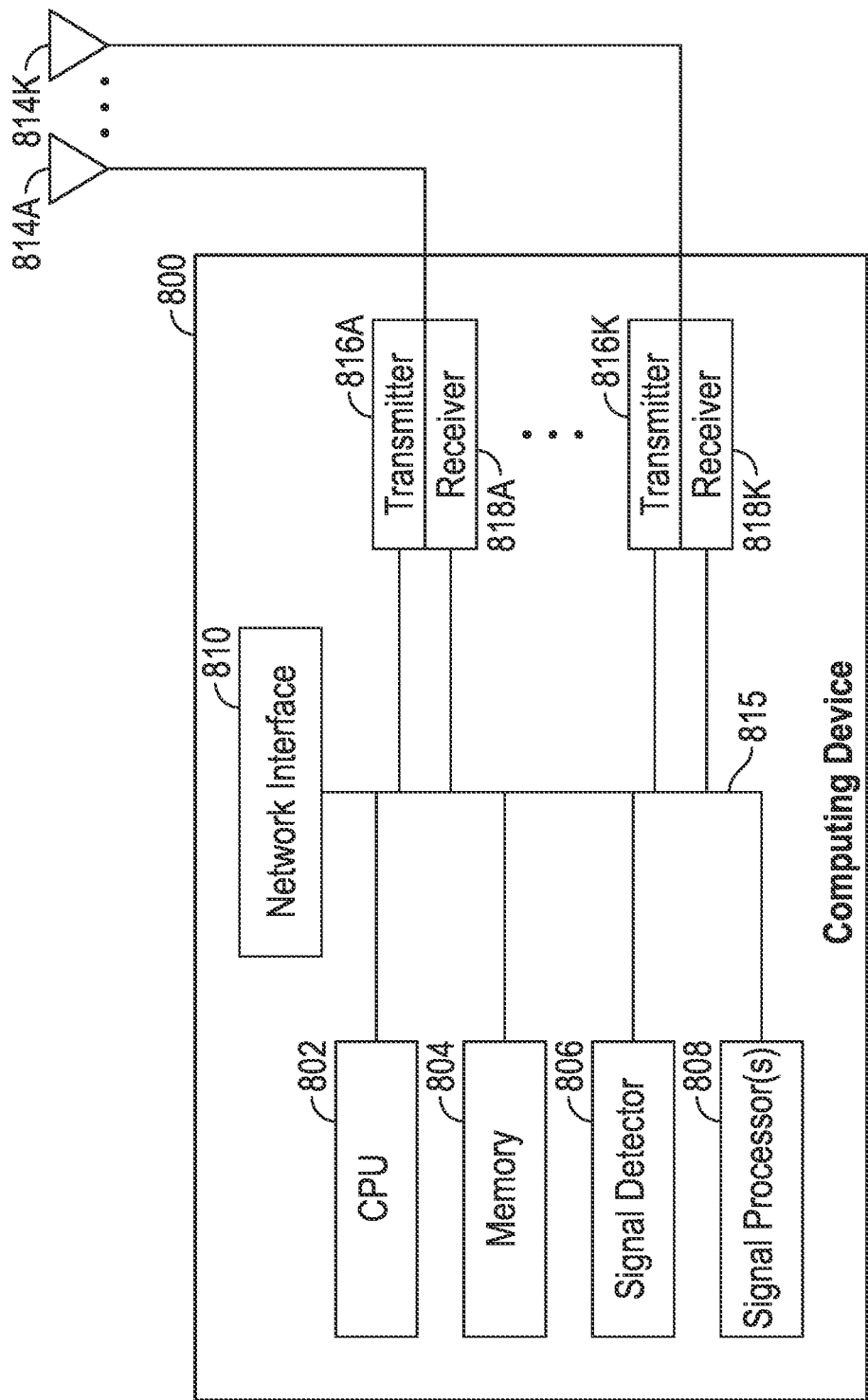
FIG. 8 illustrates an example computing device, according to one embodiment.

FIG. 8 illustrates an example computing device 800 that can implement one or more of the techniques described herein. For example, the wireless device 800 can perform method 600 and method 700. The computing device 800 can be an AP (e.g., access provider 104), a client device (e.g., client device 102), etc.

As shown, the computing device 800 includes, without limitation, a central processing unit (CPU) 802, a network interface 810, a memory 804, a signal detector 806, and signal processor(s) 808, each connected to a bus 815. The wireless device 800 also includes transmitters 816 A-K and receivers 818 A-K to allow transmission and reception of data between the computing device 800 and other device(s). Each transmitter 816 and receiver 818 can be combined into a transceiver. Multiple antennas 814 A-K are electrically coupled to the transmitters 816 A-K and receivers 818 A-K. The computing device 800 is configured to perform MIMO (e.g., MU-MIMO, single-user (SU)-MIMO) and beamforming techniques, using the multiple antennas 814 A-K.

The CPU 802 generally controls operation of the computing device 800. For example, the CPU 802 retrieves and executes programming instructions stored in the memory 804 as well as stores and retrieves application data residing in the memory 804. The memory 804, which may include both read-only memory (ROM) and random access memory (RAM), provides instructions and data to the CPU 802. A portion of the memory 804 also may include non-volatile random access memory (NVRAM). The instructions in the memory 804 are executable to implement the techniques described herein. Note CPU 802 is included to be representative of a single CPU, multiple CPUs, a single CPU having multiple processing cores, and the like.

The computing device 800 can use the signal detector 806 to detect and quantify the level of signals received by the receivers 818 A-K. The signal detector 806 may detect such signals as total energy, energy per subcarrier per symbol, power spectral density and other signals. The computing device 800 can use the signal processor(s) 808 (e.g., digital signal processor(s) (DSP(s)) in processing signals. For example, the signal processor(s) 808 can perform transmit signal processing of signals to be transmitted via the plurality of antennas 814 A-K, e.g., for MU-MIMO and OFDMA transmissions, and perform receive processing of signals that are received by the plurality of antennas 814 A-K.

The various components of the computing device 800 may be coupled together by a bus system 815, which may include a power bus, a control signal bus, and a status signal bus in addition to a data bus. The network interface 810 can be used as a wired network interface, e.g., to connect to another network via a wired medium.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method performed by a network device, comprising:
    transmitting a first quality of experience (QoE) support message to a client device, the first QOE support message querying whether the client device supports providing one or more key performance indicators (KPIs) indicative of QoE at the client device;
    receiving, in response to the first QoE support message, a second QoE support message from the client device, the second QoE support message comprising an indication of whether the client device supports providing the one or more KPIs;
    determining a type of communication access for the client device, based on the second QoE support message; and
    transmitting an indication of the type of communication access to the client device.

2. The computer-implemented method of claim 1, wherein the first QoE support message is transmitted prior to an association with the client device.

3. The computer-implemented method of claim 2, wherein determining the type of communication access comprises determining whether to allow the association or reject the association with the client device.

4. The computer-implemented method of claim 1, wherein the first QoE support message is transmitted after an association with the client device.

5. The computer-implemented method of claim 4, wherein determining the type of communication access comprises determining at least one type of traffic the client device is allowed to transmit to the network device.

6. The computer-implemented method of claim 1, wherein the indication of whether the client device supports providing the one or more KPIs comprises a Boolean value.

7. The computer-implemented method of claim 1, wherein the second QoE support message further comprises the one or more KPIs.

8. An apparatus comprising:
    a processor; and
    a memory containing a program that, when executed by the processor, performs an operation comprising:
        transmitting a first quality of experience (QoE) support message to a client device, the first QOE support message querying whether the client device supports providing one or more key performance indicators (KPIs) indicative of QoE at the client device;
        receiving, in response to the first QoE support message, a second QoE support message from the client device, the second QoE support message comprising an indication of whether the client device supports providing the one or more KPIs;
        determining a type of communication access for the client device, based on the second QoE support message; and
        transmitting an indication of the type of communication access to the client device.

9. The apparatus of claim 8, wherein the first QoE support message is transmitted prior to an association with the client device.

10. The apparatus of claim 9, wherein determining the type of communication access comprises determining whether to allow the association or reject the association with the client device.

11. The apparatus of claim 8, wherein the first QoE support message is transmitted after an association with the client device.

12. The apparatus of claim 11, wherein determining the type of communication access comprises determining at least one type of traffic the client device is allowed to transmit.

13. The apparatus of claim 8, wherein the indication of whether the client device supports providing the one or more KPIs comprises a Boolean value.

14. The apparatus of claim 8, wherein the second QoE support message further comprises the one or more KPIs.

15. A non-transitory computer readable storage medium having computer executable code stored thereon, the computer executable code being executable by one or more processors to perform an operation comprising:
    transmitting a first quality of experience (QoE) support message to a client device, the first QOE support message querying whether the client device supports providing one or more key performance indicators (KPIs) indicative of QoE at the client device;
    receiving, in response to the first QoE support message, a second QoE support message from the client device, the second QoE support message comprising an indication of whether the client device supports providing the one or more KPIs;
    determining a type of communication access for the client device, based on the second QoE support message; and
    transmitting an indication of the type of communication access to the client device.

16. The non-transitory computer readable storage medium of claim 15, wherein the first QoE support message is transmitted prior to an association with the client device.

17. The non-transitory computer readable storage medium of claim 16, wherein determining the type of communication access comprises determining whether to allow the association or reject the association with the client device.

18. The non-transitory computer readable storage medium of claim 15, wherein the first QoE support message is transmitted after an association with the client device.

19. The non-transitory computer readable storage medium of claim 16, wherein determining the type of communication access comprises determining at least one type of traffic the client device is allowed to transmit.

20. The non-transitory computer readable storage medium of claim 15, wherein the second QoE support message further comprises the one or more KPIs.

* * * * *